No. 622,072. Patented Mar. 28, 1899.
B. R. PRATT.
POTATO DIGGING MACHINE.
(Application filed Mar. 30, 1898.)
(No Model.) 3 Sheets—Sheet 1.
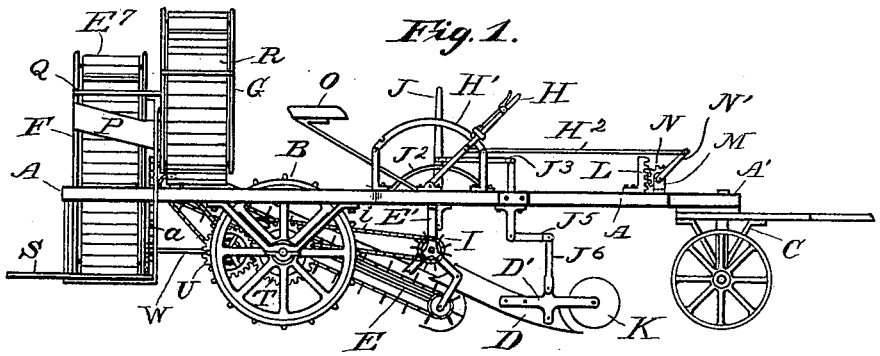
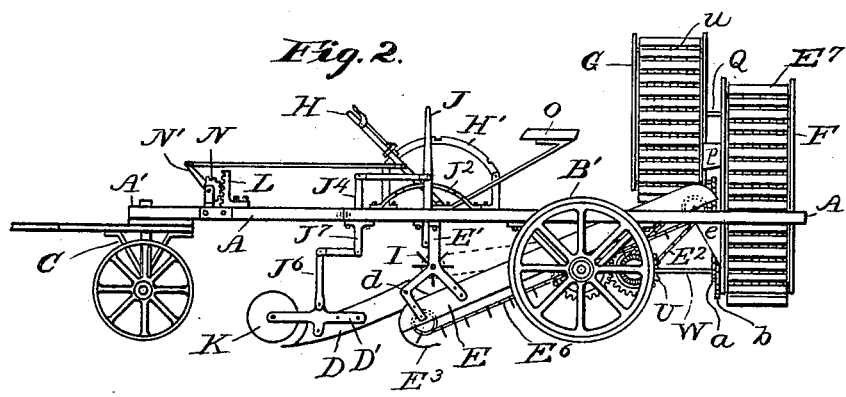
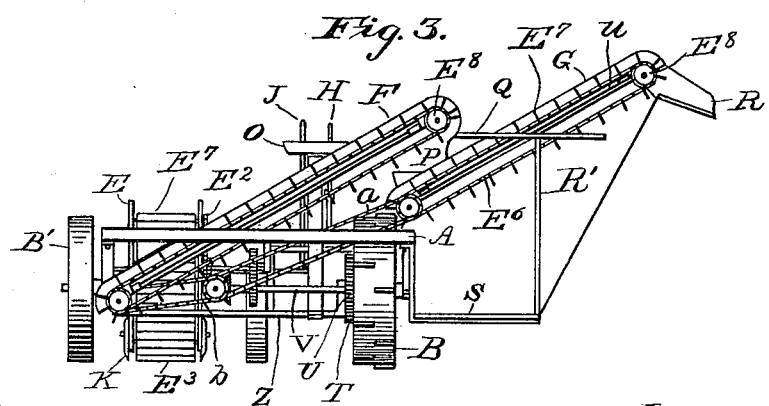
Witnesses:
Wm E Thompson
B. E. Doll.
Inventor:
Bennett R. Pratt,
By E. T. Silvius,
Attorney.

No. 622,072. Patented Mar. 28, 1899.
B. R. PRATT.
POTATO DIGGING MACHINE.
(Application filed Mar. 30, 1898.)
(No Model.) 3 Sheets—Sheet 2.
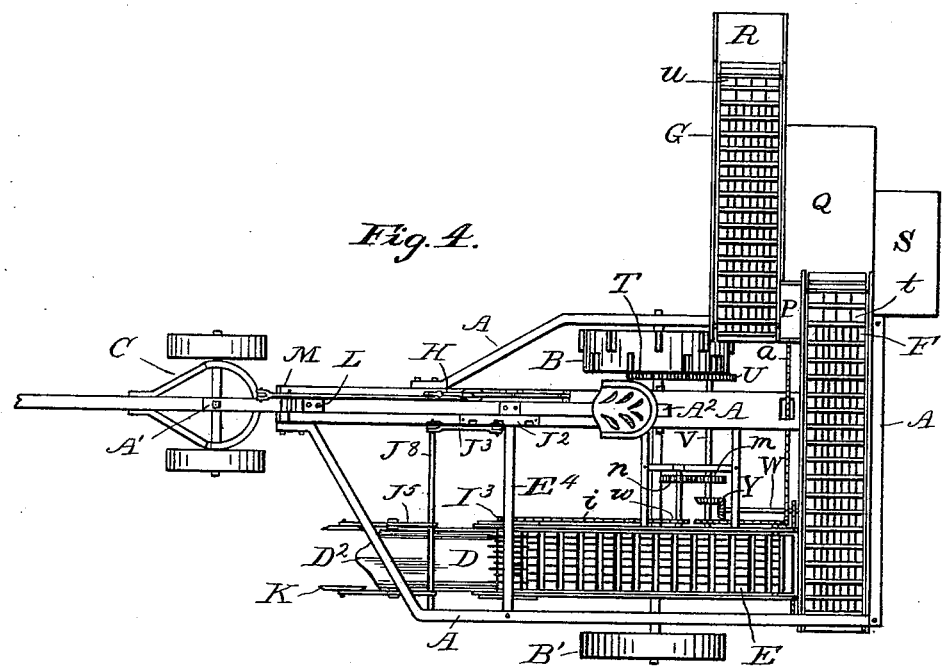
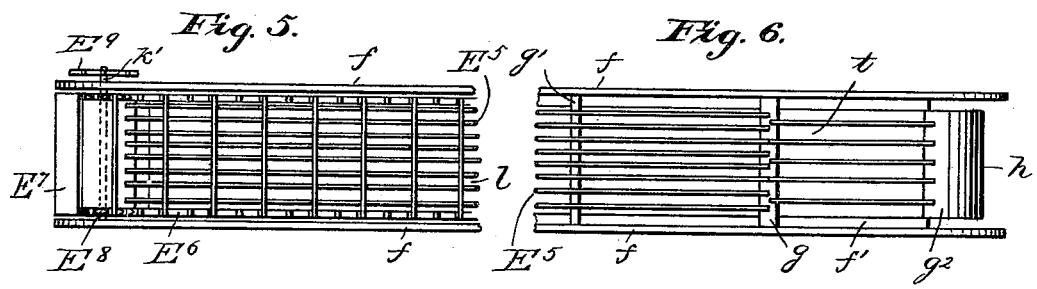
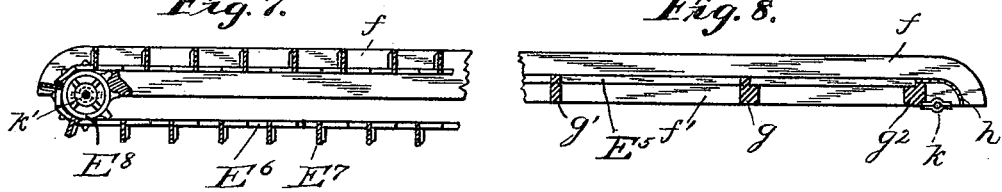
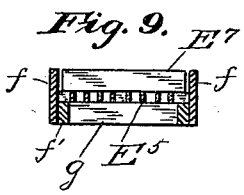
Witnesses:
Wm E Thompson
B. E. Doll.
Inventor:
Bennett R. Pratt.
By E. T. Silvius,
Attorney.

No. 622,072. Patented Mar. 28, 1899.
B. R. PRATT.
POTATO DIGGING MACHINE.
(Application filed Mar. 30, 1898.)

(No Model.) 3 Sheets—Sheet 3.

Witnesses:
Wm C Thompson
B. E. Doll.

Inventor:
Bennett R. Pratt.
By E. T. Silvius
Attorney.

THE NORRIS PETERS CO., PHOTO-LITHO., WASHINGTON, D. C.

UNITED STATES PATENT OFFICE.

BENNETT R. PRATT, OF SHARPSVILLE, INDIANA.

POTATO-DIGGING MACHINE.

SPECIFICATION forming part of Letters Patent No. 622,072, dated March 28, 1899.

Application filed March 30, 1898. Serial No. 675,737. (No model.)

*To all whom it may concern:*

Be it known that I, BENNETT R. PRATT, a citizen of the United States, residing at Sharpsville, in the county of Tipton and State of Indiana, have invented certain new and useful Improvements in Potato-Digging Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the class of machines that are designed to be propelled by horse-power or by a motor for the purpose of harvesting potatoes; and it consists in certain novel and peculiar features of construction and in the parts and combination and arrangement of parts hereinafter more fully described and claimed.

My object is to provide a machine of this character which shall embody the most advantageous features, whereby the potatoes may be removed from the earth, separated therefrom, sized, and loaded into a wagon ready for transportation in a continuous operation, and which shall have a simple and inexpensive form of construction. These objects are fully attained in my invention, and it is furthermore durable and economical in use.

Figure 10:
Figure 11:
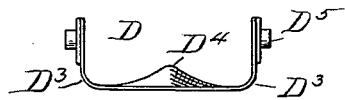
Figure 12:
Figure 13:
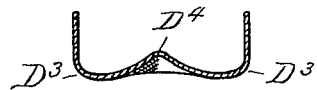
Figure 14:
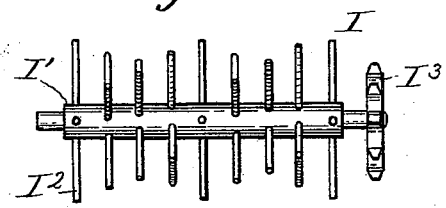
Figure 15:
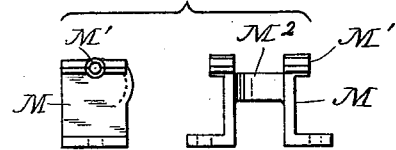
Figure 16:
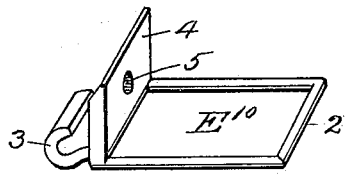
Figure 17:
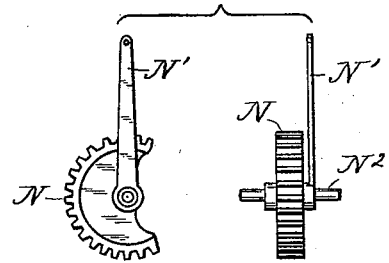

Referring to the drawings, Figure 1 represents a right-hand side and Fig. 2 a left-hand side elevation, Fig. 3 a rear elevation, and Fig. 4 a top plan view, of a potato-digging machine constructed in accordance with my invention; Fig. 5, a plan view of a portion of an elevator; Fig. 6, a top plan view or a portion of an elevator-frame and separator; Fig. 7, a central vertical sectional view of Fig. 5; Fig. 8, a central vertical sectional view of Fig. 6; Fig. 9, a transverse sectional view of an elevator-frame and separator; Fig. 10 a side elevation, Fig. 11 a rear end view, Fig. 12 a central longitudinal section, and Fig. 13 a transverse central sectional view, of the scoop or plow; Fig. 14, an elevation of the clod-breaker; Figs. 15, 16, and 17, detail views of parts of the machine.

In the drawings, A A' designate the main supporting-frame; B, the drive-wheel, which is also a supporting-wheel; B', a supporting-wheel; C, the forward swiveled supporting-truck, which may be carried by either one or two wheels, as desired; D, the scoop; E F G, the combined elevators and separators, and I the clod-breaker.

In constructing my machine I provide a suitable framework to support the various parts and secure it rigidly to an axle mounted in the rear wheels. The main frame may be made of light angle-iron in whole or in part, and parts may be combined with wood, and suitable braces (not defined herein) may be employed as may be desired. The principal features of the main frame consist in forming the tongue or part A' separately and providing a pivotal or hinged connection with the other portion at $A^2$, or approximately above the main axle, while the forward end of the tongue has a king-bolt or swiveled connection with the truck C. Thus while the tongue remains stationary the balance of the frame and all the mechanism carried by it may be tilted to lift the scoop clear of the ground when not in use. To control this movement and maintain the proper positions, I provide a frame M, which is bolted at the forward end of the main frame to the top of the parts at both sides of the tongue. It has a web $M^2$ and journal-bearings M', the latter carrying a shaft $N^2$, to which is secured a segment N of a toothed wheel and a lever N'. A vertical toothed rack L is secured to the top of the tongue A', so as to be in mesh with the segment N, and it may be also adapted to provide a guide for the forward end of the main frame in its vertical movements to prevent lateral movement. A controlling-lever H is mounted upon the frame near the seat O and has a rod $H^2$ connecting it with the lever N', and it may be retained in various positions by means of a suitable latch engaging notches in a quadrant H', secured to the frame.

The means I employ whereby the potatoes after being scooped from the earth are separated and cleaned and assorted according to sizes suitable for marketing are comprised in the combined elevators and separators E F G, which are peculiarly constructed and operated; but it is not necessary that they should be three in number nor that they should be arranged relatively as shown. This arrangement is preferred as being compact and the whole well balanced, so that the operation is continuous, and as the accumulation of potatoes on a machine would become objectionable it is preferable to have a wagon accompany it, into which the potatoes may be loaded either loose or in bags. Hence my design in elevating the potatoes sufficiently high to overreach a wagon, while at the same time providing the greatest area for cleaning or freeing them from earth.

The construction of the elevators E, F, and G is in the main alike except as to the location of the driving sprocket-wheels $E^9$ at either side or end, as may be required, and the spacing of the bars $E^5$ for sizing the potatoes. Each elevator comprises a frame consisting of side boards $f$, rails $f'$, and cross-pieces $g$ $g'$ $g^2$, the bars $E^5$, a shaft $k'$ at each end revoluble in bearings $k$, a sprocket-wheel $E^8$ at each end of each shaft and secured thereto within the side boards, a driving sprocket-wheel $E^9$ at an outer end of one of the shafts outside the side board, a carrier-chain $E^6$ at the inside of each side board and running over the sprocket-wheels at the ends of the frame, and the flights $E^7$, secured to both carrier-chains and extending from one to the other transversely across the frame, so that they scrape the top surfaces of the bars $E^5$. The bars form an open floor or screen over which the potatoes and earth are drawn by the flights, and they are preferably made of rectangular flat bar-iron set up edgewise in suitable notches in the cross-pieces of the frame. Sheet-metal semicircular end pieces $h$ finish off the ends and cover the shafts. In elevator E the bars are set at a uniform distance apart, so that the spaces $l$ shall permit the earth to pass through but retain the potatoes on top. In elevator F the bars are spaced likewise, except in a section at the upper end, in which the spaces $t$ are wide enough to permit the potatoes to pass through, but not the vines and weeds. In elevator G the spacing is also the same, except in the section at the upper end, in which the spaces $u$ permit the smaller potatoes to pass through but retain the larger ones. An additional section may also be provided for separating a third size, if desired. The carrier-chains are of the usual type adapted for this purpose, except that a suitable number of links $E^{10}$ are provided each with an ear 4, having a bolt-hole 5, to which an end of a flight is bolted, and each end 2 of the link engages the hook 3 of the next adjoining link.

The elevator E is mounted at a suitable angle, having its lower end safely above the ground, and is provided with a sheet-metal shield $E^3$ to protect the flights. It is rigidly secured to the main frame by suitable means at the upper end, while its lower end is suspended to the main frame by means of brackets $E'$ of suitable design. Its driving sprocket-wheel is secured to the upper shaft, preferably at the right-hand side. The flights traverse upward over the bars forming its floor and return below the bars, clearing them and the frame. Below the upper end is a suitable chute $e$ to convey to the elevator F. It will be observed that in Figs. 1 and 3 the side board $f$ toward the viewer is not shown, in order that the flights may be exposed.

Elevator F is mounted at a suitable angle and supported by the main frame transversely thereto, its lower end being situated so as to receive the potatoes from the chute $e$ and carry them upward, at the same time separating them further from earth, and delivering them through the spaces $t$ to a suitable chute P, while the vines are carried over the upper end and discharged upon a table Q, from which they may be thrown to the ground by an attendant standing upon the platform S. The driving-sprocket is secured to the inner end of the lower shaft.

The elevator G is suitably supported by the main frame at a suitable angle, and its lower end is situated so as to receive the potatoes from the chute P, and as they are carried upward, exposed to view, and now thoroughly cleaned the attendant may readily observe stones which may have been taken up and throw them out, thus rendering the produce of much greater marketable value. The smaller sizes pass through the spaces $u$, where they may be dropped into a suitable bin R, which may be conveniently arranged for bagging them and transferring to an accompanying wagon. The larger sizes pass over the upper end and are conveyed by a chute R to any bagger or an accompanying wagon. The driving sprocket-wheel is secured at the rear side of the elevator to the lower shaft.

To operate the elevators in unison, I provide a gear-wheel T, secured to the driving-wheel B, and conveniently mount a shaft V, having a gear-wheel U meshing with the wheel T, the opposite end having a sprocket-wheel, over which runs the driving-chain $E^2$ for the elevator E. Adjacent is a shaft W, mounted at a right angle and actuated by beveled gear-wheels Y in engagement, one on each shaft. The shaft W carries a sprocket-wheel from which the chain $b$ drives the elevator F and also a like wheel from which the chain $a$ drives the elevator G. Any suitable clutch mechanism and lever may be employed by which to stop the motion of the shaft V when backing the machine or when not digging potatoes. Many well-known forms are adaptable.

The scoop D combines in its construction also a plow and is suitably made of sheet-iron, having sides turned up and open ends, rounded corners $D^3$ being preferably formed to prevent adherence of moist earth and also to assist in breaking it up. The forward end of the bottom has a point $D^2$, and the central portion $D^4$ is crowning to, in a measure perform the function of a plow and break up the earth, also raising it and aiding the point to penetrate. Each outer side, near the rear end, is provided with a bracket D⁵, having a pivot-hole d', by which the scoop is pivoted, as at d, to arms of the brackets E', and the forward end is adjustably supported, so that the scoop is at a gentle angle, permitting the earth and potatoes to be pushed up to the elevator E by the momentum of the machine against the resistance of the earth mound or row. Brackets D' are secured to the forward end of the sides of the scoop, each preferably carrying a disk colter K.

In order to provide a proper vertical adjustment of the nose of the scoop, I mount a shaft J⁸ and suitably support it to the main frame by brackets J⁷. This shaft has a lever J⁴, to the upper end of which is connected a rod J³, having its opposite end connected to a lever J, the latter being pivoted at its lower end to a suitable bracket on the main frame, and may be held in various positions by springing laterally into notches in the side of a quadrant J², or equivalent mechanism may be employed. The shaft has arms J⁵, to which the brackets D' are connected by hangers J⁶.

To thoroughly break up the earth, so that it may be the more surely separated from the potatoes, I provide a breaker I, mounted revolubly across the rear end of the scoop and a sufficient distance above its floor to prevent bruising the potatoes. It consists of a shaft I', having a series of projecting pins I², preferably arranged in spiral rows. A drive-wheel I³ is secured to the shaft and is driven by a chain belt i, connecting with a wheel w on a suitably-mounted shaft, to which is secured a gear-wheel n, engaging a gear-wheel m, secured to the shaft.

The exact arrangement of the mechanism for operating the elevators and breaker need not be followed, although that shown is very accessible, and the axle Z is deflected to clear the several parts. The main axle might be made straight and adapted to revolve, the other minor details being designed to conform. In the arrangement and combination shown it has been my object to produce the most simple and durable and therefore the most economical forms of construction. Any suitable arrangement and means may be employed for propulsion and steering as may be desired.

Having thus described my invention, what I claim as new, and desire to secure by Letters Patent, is—

1. A potato-digging machine, comprising a suitable framework mounted upon wheels and adjustably supported at its forward end upon a swiveled truck, combined elevators and separators mounted on said framework and each consisting of a frame having at each end a transverse revolving shaft carrying a sprocket-wheel at each end thereof, an endless carrier-chain at each side of said frame extending from one end to the other end thereof and running over said sprocket-wheels, flights secured to said carrier-chains and extending transversely across said elevator from one to the other of said chains, bars or rods forming an open floor for said elevator, said bars or rods being parallel and adapted to be swept by said flights and spaced at suitable distances apart for screening and separating earth from potatoes and separating large from small potatoes; a scoop adapted to gather earth and potatoes and deliver to the forward one of said elevators and having a suitable support whereby it is suspended to said framework, means for controlling the adjustability of said framework and said scoop, and means by which said elevators may be actuated in unison, substantially as shown and described.

2. In a potato-digging machine, the combination with a suitably-mounted framework and a scoop for gathering up potatoes and earth, of a combined elevator and separator consisting of a frame mounted upon said framework and having its forward end depressed to receive the contents of said scoop, a series of bars or rods supported upon said frame and forming a screen-floor therefor, portions of said bars or rods being sufficiently far apart to permit earth to pass between but retain potatoes and other portions being so spread apart as to adapt them to permit smaller sizes of potatoes to pass between while retaining larger sizes, a transversely-mounted revoluble shaft at each end of said frame, a carrier-chain running at each side of said frame and over sprocket-wheels secured to said shafts, and flights secured to said carrier-chains and extending from one to the other and across said bars or rods sweeping the top surfaces thereof, and means by which said flights may be operated to draw the potatoes over said screen-floor, substantially as shown and described.

3. In a potato-digging machine, the combination with a suitably-mounted main frame, of the scoop pivotally supported at its rear end and adjustably supported at its forward end, the elevator E connecting with the rear end of said scoop and situated longitudinally with and supported by said main frame, said elevator being adapted to draw earth and potatoes over its bottom, separated bars or rods forming the bottom of said elevator whereby the earth may separate from the potatoes and pass away; the transversely-situated elevator F mounted upon said main frame and having its lower end arranged to receive from said first-named elevator, the screen-floor in said elevator F composed of a section of bars or rods adapted to permit earth only to pass through and a section adapted to permit potatoes to pass through but to retain vines; the elevator G mounted upon said main frame and having its lower end arranged to receive from said elevator F, the screen-floor in said elevator G composed of a section of bars or rods adapted to permit earth only to pass through and a section adapted to permit potatoes of smaller sizes only to pass through; the flight sweeping said elevator-floors, and means by which said flights may be operated, substantially as shown and described.

4. A power-machine whereby potatoes may be gathered from the earth, separated therefrom, graded into several sizes and elevated and delivered into an accompanying vehicle, and comprising a main supporting-frame, a rear axle rigidly attached to said main frame, a carrying-wheel at each end of said axle one of said wheels being also a driving-wheel, a swiveled truck carrying the forward end of said main frame, a vertically-adjustable scoop having a centrally-crowning bottom, a series of combined elevators and separators forming a train from said scoop and terminating at an elevation above a vehicle-body, said elevators having screening and sizing floors and carrier-flights sweeping the top surfaces thereof, and intermediate mechanism by which said drive-wheel may convey motion to said elevator-flights, substantially as shown and described.

5. In a potato-digging machine, the combination of the main frame suitably mounted, the combined elevators and separators mounted upon said main frame, the scoop provided with an elongated nose and a bottom having a centrally-crowning or ridged portion and pivoted at its rear end above the lower end of the forward one of said elevators and means by which its forward end is adjustably supported by said main frame, substantially as shown and described.

6. In a potato-digging machine, a scoop for gathering potatoes from the earth, consisting of a closed bottom and having a crowning or elevated ridge at its central portion, sides having rounded corners where they intersect said bottom, and provided with an extended or elongated nose centrally disposed and extending beyond said sides, and means for supporting said scoop, substantially as shown and described.

7. In a power potato-digging machine, the combination of the carrying-wheels, the drive-wheel, the main frame, the scoop pivoted at its rear end and adjustably supported at its forward end, the series of combined elevating and separating elevators one of which is adapted to receive from said scoop and separate earth from potatoes, another of which is adapted to separate the vines from the potatoes, and the other of which is adapted to separate the potatoes into graded sizes, said elevators each consisting of a frame having a screen-bottom and carrier-flights sweeping the top surfaces of said bottoms whereby the potatoes are agitated, separated from the refuse and elevated for delivery into an accompanying vehicle continuously, and intermediate mechanism whereby said elevators may be operated by said drive-wheel, substantially as shown and described.

In testimony whereof I affix my signature in presence of two witnesses.

BENNETT R. PRATT.

Witnesses:
B. F. WEST,
J. E. BALLINGER.